Figure 1:
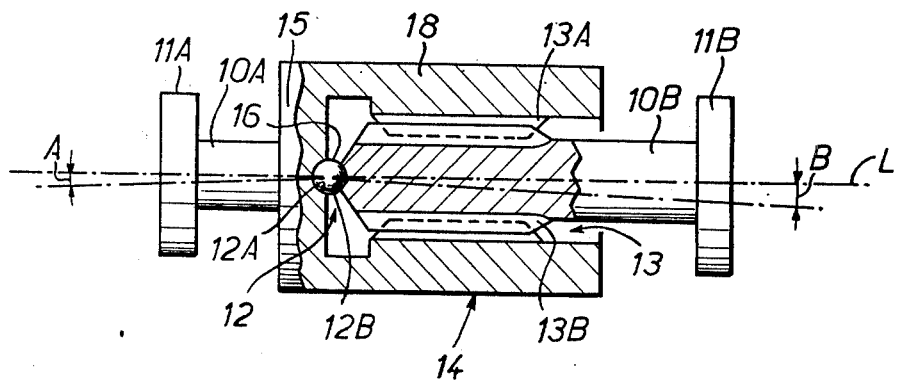

United States Patent [19]

Filderman

[11] 4,003,218
[45] Jan. 18, 1977

[54] CONSTANT VELOCITY UNIVERSAL JOINT
[75] Inventor: René Filderman, Asnieres, France
[73] Assignee: Societe Anonyme Francaise du Ferodo, Paris, France
[22] Filed: Apr. 8, 1975
[21] Appl. No.: 566,112
[30] Foreign Application Priority Data
Apr. 17, 1974 France .............. 74.13386
[52] U.S. Cl. .................. 64/21; 64/6; 64/7; 64/9 R
[51] Int. Cl.² ................ F16D 3/30
[58] Field of Search ......... 64/9 R, 8, 7, 6, 21
[56] References Cited
UNITED STATES PATENTS

| | | | |
|---|---|---|---|
| 2,518,481 | 8/1950 | Maguire | 64/9 |
| 2,667,048 | 1/1954 | Whitfield | 64/9 |
| 2,744,395 | 5/1956 | Massey et al. | 64/9 |
| 3,070,979 | 1/1963 | Shipley et al. | 64/9 |
| 3,385,135 | 5/1968 | Standburg | 64/21 |

Primary Examiner—Samuel Scott
Assistant Examiner—Randall Heald
Attorney, Agent, or Firm—Young & Thompson

[57] ABSTRACT

A constant velocity universal joint for coupling two shafts and for transmitting rotation between the shafts and enabling, independently, transmission of axial thrust between the shafts and/or slight angular displacements of the shafts relative to their axially aligned position. The constant velocity joint comprises two stub shafts adapted to be fixed to the shafts. One of the stub shafts having a cup-shaped end portion with an inwardly extending flange at its open end for mounting a socket member of a ball and socket joint whose toroidal ball member is mounted near the end of the other stub shaft. A first cylindrical sleeve is joined to the cup-shaped end portion of the flange and has an internally toothed gear at its free end meshing with radial clearance with an externally toothed gear at one end of a second cylindrical sleeve coaxial of the first cylindrical sleeve. An internally toothed gear at the other end of the second sleeve meshes with radial clearance with an externally toothed gear on the other stub shaft. The joint is of constant velocity operation.

12 Claims, 2 Drawing Figures

U.S. Patent      Jan. 18, 1977      4,003,218

CONSTANT VELOCITY UNIVERSAL JOINT

The present invention relates to a novel constant velocity universal joint adapted to couple two rotary shafts and, depending on the particular application, to allow relative axial movements and/or moderate angular displacements from a position of axial alignment of the shafts.

It has already been proposed to make a universal joint comprising two substantially coaxial stub shafts bearing substantially axially against each other through a ball and socket joint, and gear means connecting the stub shafts for rotation with play sufficient to enable angular variations from a position of axial alignment.

The play allows moderate relative angular displacement of the stub shafts from their axially aligned position, and the ball and socket means interposed therebetween enables the transmission of axial thrust from one stub shaft to the other irrespective of the lack of axial alignment of the stub shafts.

Such joints, however, are not constant velocity in operation.

In order to render such joints constant velocity in operation, one would naturally think of duplicating the parts of the non-constant velocity joint.

Such a duplication of parts would not only lead to an expensive device by the provision of two ball and socket joints, but it would also require an intermediate shaft between the ball joints which could be disoriented either by the driving shaft or the driven shaft, and therefore prejudicial to the proper transmission of axial thrust.

An object of the present invention is a constant velocity universal joint free of this drawback.

According to the invention there is provided a constant velocity joint for coupling two shafts and for transmitting rotation between the shafts, and enabling independently, transmission of axial thrust therebetween and/or slight angular displacements of the shafts relative to their position of axial alignment: comprising, in combination, two stub shafts adapted to be fixed respectively to shafts to be coupled, said stub shafts being normally substantially coaxial and bearing axially against each other through ball and socket joint means, and a plurality of cooperating internally and externally toothed gears coupling said stub shafts for rotation and meshing with clearance for enabling slight angular displacements of said stubs shafts relative to their axially aligned position, said plurality of gears including, at least, one internally toothed gear mounted for rotation with a first said stub shaft and one externally toothed gear mounted for rotation with the second said stub shaft, thereby providing constant velocity rotation between said stub shafts.

The resultant joint is a constant velocity joint although it has only a single ball and socket joint.

The constant velocity universal joint according to the invention ensures a suitably rigid coupling of the stub shafts and therefore does not consume energy during rotation.

The constant velocity joint according to the invention therefore has applications in measuring instruments where it advantageously permits measurements of axial thrust and torque independently of each other.

Figure 2:
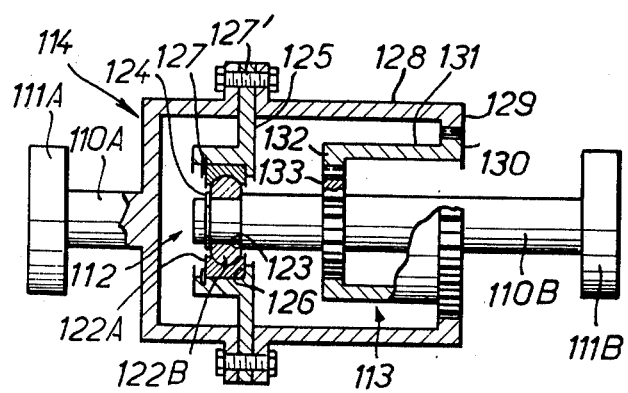

The features and advantages of the invention will become clearer from the description which follows, given by way of example, with reference to the accompanying drawing, in which:

FIG. 1 is an axial sectional view of a prior art non-constant velocity universal joint, and FIG. 2 is a view similar to FIG. 1 showing a constant velocity universal joint according to the invention.

FIG. 1 shows a known non-constant velocity joint comprising two stub shafts 10A and 10B adapted to be fixed for rotation with main driving and driven shafts (not shown). The stub shafts 10A and 10B have coupling collars 11A, 11B respectively. The stub shafts 10A, 10B are normally substantially coaxial and effectively the continuation of each other. The stub shafts 10A, 10B bear substantially axially against each other through the ball and socket joint 12 and are connected for rotation with each other through gear means 13 with radial clearance.

In the prior art construction of FIG. 1, the stub shaft 10A has a cup-shaped member 14 at its end opposite the coupling collar 11A. The closed end 15 has an axially aligned socket portion 12A for a spherical ball member 16. The stub shaft 10B has another corresponding socket portion 12B for retaining the spherical ball member 16. The combination of the spherical ball member 16 and the pair of socket portions 12A and 12B thus forms the ball and socket joint 12 effectively mounted between the stub shafts 10A and 10B.

The cylindrical wall 18 of the cup-shaped member 14 is provided with longitudinal internal gear teeth 13A meshing with radial clearance with longitudinal external gear teeth 13B provided on the corresponding peripheral portions of the stub shaft 10B. The combination of loosely radially meshing gear teeth 13A, 13B thus constitutes the gear means with radial clearance effectively mounted between the stub shafts.

As will be easily understood, the play between the splines or gear teeth enables a certain amount of relative angular displacement of the stub shafts 10A, 10B relative to the theoretical axis L of axial alignment of the stub shafts, or as shown schematically in FIG. 1, angular displacements A and B relative to the theoretical axis of alignment. Consequently, there is a possibility of small angular displacements of the stub shafts 10A, 10B relative to their position of axial alignment. However, such a joint is not constant velocity in operation.

The torque and/or axial thrust transmitting joint according to the invention is generally of the type hereinabove described but is, in addition, constant velocity in operation.

As shown in FIG. 2, the constant velocity joint according to the invention comprises a single ball and socket joint means generally designated by reference numeral 112. The single ball and socket joint means is interposed between stub shafts 110A and 110B, and according to the preferred embodiment of the invention, comprises a generally toroidal ball member 122B with a cylindrical central bore and a convex outer surface held in place on the stub shaft 110B between a shoulder 123 formed thereon and a retaining clip 124 secured near the free end thereof.

The ball and socket joint means 112 further comprises a socket member including two grooved ring halves 122A defining a concave part-toroidal surface complementary to the convex outer surface of the generally toroidal ball member. The grooved ring halves 122A are carried on a flange 125 and held between a shoulder 126 thereon and a retaining clip 127 secured thereto.

The flange 125 is fastened by screws 127' at its periphery to the cup-shaped member 114 at the end of the stub shaft 110A opposite the collar 111A; the same screws 127' also fasten a first cylindrical sleeve 128 to said cup-shaped member on the stub shaft 110A. At the end of the first cylindrical sleeve 128 opposite the screws 127', there is an internally toothed gear 129 which meshes with radial clearance with an externally toothed gear 130 formed at one of the ends of a second cylindrical sleeve 131 disposed coaxially and inside, in the illustrated embodiment, of the first cylindrical sleeve 128.

At the other end of the second cylindrical sleeve 131 is provided an internally toothed gear 132 which meshes with radial clearance with an externally toothed gear 133 keyed to the stub shaft 110B.

The meshing gear means with radial clearance operatively interposed between the stub shafts 110A, 110B thereby comprise, in the illustrated embodiment, two axially spaced pairs of internally and externally toothed gears.

In practice, the radial clearance between the teeth of the meshing internally and externally toothed gears allows a certain degree of axial displacement of the stub shafts relative to their position of axial alignment, for example, 4°–5°.

Irrespective of axial alignment of the stub shafts 110A, 110B or the lack thereof, they are coupled for rotation and, if need be, transmission of torque from one stub shaft to the other.

Further, and also irrespective of the axial alignment or lack of alignment of stub shafts, there may be transmission of thrust from one stub shaft to the other.

The transmission of the thrust from one stub shaft to the other, however, is advantageously independent of the transmission of torque thereby enabling the measurement of torque and thrust transmission independently of each other.

The present invention is not intended to be limited to the preferred embodiment described and illustrated herein, but on the contrary encompasses all alternative constructions and/or combinations of the various parts within the scope of the appended claims.

For example, it goes without saying that it is possible to increase the number of internally and externally toothed pairs of gears constituting the gear means with radial clearance, effectively disposed between the stub shafts 110A and 110B.

What is claimed is:

1. A constant velocity joint for coupling two shafts and for transmitting rotation between the shafts, and enabling independently transmission of axial thrust therebetween and/or slight angular displacements of the shafts relative to their position of axial alignment: comprising, in combination, two stub shafts adapted to be fixed respectively to shafts to be couples, means for transmitting axial thrust between said stub shafts including ball and socket joint means through which said stub shafts effectively bear against each other, and a plurality of cooperating internally and externally toothed gears coupling said stub shafts for rotation and meshing with clearance for enabling slight angular displacements of said stub shafts relative to their axially aligned position, said plurality of gears including, at least, one internally toothed gear mounted for rotation with a first said stub shaft and one externally toothed gear mounted for rotation with the second said stub shaft, thereby providing constant velocity rotation between said stub shafts.

2. A constant velocity universal joint according to claim 1, wherein a cup-shaped end portion is fixed on one of said stub shafts, a radially inwardly extending flange secured at the open end of said cup-shaped member and mounting the socket member of said ball and socket joint means, the ball member of said ball and socket joint means being mounted on said other stub shaft.

3. A constant velocity joint according to claim 2, wherein a first cylindrical sleeve is joined to the periphery of both said cup-shaped member and said inwardly extending flange for movement with said one stub shaft.

4. A constant velocity joint according to claim 2, wherein said the internally toothed gear is formed on said first cylindrical sleeve and wherein said one externally toothed gear is mounted on said other stub shaft.

5. A constant velocity joint according to claim 4, further comprising a second cylindrical sleeve arranged coaxially of said first cylindrical sleeve and having at one of its ends another externally toothed gear meshing with radial clearance with said one internally toothed gear on said first cylindrical sleeve and having at its other end another internally toothed gear meshing with radial clearance with said externally toothed gear on said other stub shaft.

6. A constant velocity joint according to claim 2, wherein the ball member of said ball and socket joint means is generally toroidal in shape, and wherein the socket member is complementary in shape to ball member.

7. A constant velocity joint according to claim 6, wherein said socket member is formed of two part-annular portions.

8. A constant velocity joint according to claim 5, wherein said second cylindrical sleeve is disposed inside said first cylindrical sleeve.

9. A constant velocity joint according to claim 1, wherein said ball and socket joint means is a single ball and socket joint including a ball member and a socket member.

10. A constant velocity joint according to claim 9, wherein means mounting the ball member are fixed to one of said stub shafts and means mounting said socket member is fixed to the other of said stub shafts.

11. A constant velocity joint according to claim 1, wherein said internally and externally toothed gears are all disposed to one side of said ball and socket joint means.

12. A constant velocity joint according to claim 10, and a first cylindrical sleeve secured to said first stub shaft and carrying at one end said internally toothed gear, and a second cylindrical sleeve disposed inside said first cylindrical sleeve and having external gear teeth at one end meshing with said internally toothed gear and internal gear teeth at the other end meshing with said externally toothed gear.

* * * * *